US00RE34041E

United States Patent [19]

Doan

[11] E Patent Number: Re. 34,041

[45] Reissued Date of Patent: Aug. 25, 1992

[54] DISPOSABLE HAZARDOUS AND RADIOACTIVE LIQUID AQUEOUS WASTE COMPOSITION AND METHOD

[75] Inventor: Darryl J. Doan, Laurel, Mont.

[73] Assignees: James William Ayres; Farrell D. Rowsell, Las Vegas, Nev.

[21] Appl. No.: 598,908

[22] Filed: Oct. 16, 1990

Related U.S. Patent Documents

Reissue of:

[64] Patent No.: 4,781,860
Issued: Nov. 1, 1988
Appl. No.: 54,139
Filed: May 11, 1987

U.S. Applications:

[63] Continuation of Ser. No. 821,906, Jan. 23, 1986, abandoned, which is a continuation-in-part of Ser. No. 818,323, Jan. 13, 1986, abandoned.

[51] Int. Cl.[5] ..... G21F 9/16; G21F 9/08; C02F 1/42; C02F 1/68

[52] U.S. Cl. ..... 252/628; 210/680; 210/681; 210/682; 210/691; 210/751; 210/908; 210/909; 210/910; 252/631; 252/633; 405/128; 405/129

[58] Field of Search ..... 252/628, 631, 633, 626; 210/680, 681, 682, 691, 751, 908, 909, 910; 405/128, 129

[56] References Cited

U.S. PATENT DOCUMENTS

| | | | |
|---|---|---|---|
| 3,167,504 | 1/1965 | Hayden et al. | 252/631 |
| 3,196,106 | 7/1965 | Haden et al. | 252/628 |
| 3,227,657 | 1/1966 | Haden et al. | 252/315.2 |
| 3,274,784 | 9/1966 | Shock et al. | 252/628 |
| 3,487,928 | 1/1970 | Canevari | 210/682 |
| 4,113,504 | 9/1978 | Chen et al. | 106/97 |
| 4,425,244 | 1/1984 | House | 252/28 |
| 4,439,062 | 3/1984 | Kingsbury | 405/35 |
| 4,464,274 | 8/1984 | House | 252/28 |
| 4,473,477 | 9/1984 | Beall | 210/691 |
| 4,528,129 | 7/1985 | Manchak | 252/628 |
| 4,615,809 | 10/1986 | King | 210/751 |
| 4,650,590 | 3/1987 | Beall | 210/691 |

OTHER PUBLICATIONS

Hurlbut et al. 1977, Manual of Mineralogy-19th Edition, John Wiley & Sons, New York, pp. 402–403.

*Primary Examiner*—Brooks H. Hunt
*Assistant Examiner*—Ngoclan T. Mai
*Attorney, Agent, or Firm*—Jerry R. Seiler

[57] ABSTRACT

An improved method of disposing of radioactive or hazardous liquid aqueous waste compositions having a substantial amount of dissolved solids comprises mixing the liquid under a high mechanical shear with a clay selected from the group consisting of attapulgite, sepiolite, and mixtures thereof. Water soluble or miscible organic liquids as well as liquid hydrocarbon mixtures thereof may also be solidified by utilizing the aforesaid clays together with an organic ammonium montmorillonite having at least 10 carbon atoms, the amount of montmorillonite used being proportional to the amount of liquid hydrocarbon present.

18 Claims, No Drawings

DISPOSABLE HAZARDOUS AND RADIOACTIVE LIQUID AQUEOUS WASTE COMPOSITION AND METHOD

Matter enclosed in heavy brackets [ ] appears in the original patent but forms no part of this reissue specification; matter printed in italics indicates the additions made by reissue.

REFERENCE TO OTHER APPLICATIONS

This is a continuation of co-pending application Ser. No. 06/821,906, filed Jan. 23, 1986, now abandoned, and a continuation-in-part of my application Ser. No. 818,323, filed Jan. 13, 1986, *now abandoned.*

BACKGROUND OF THE INVENTION

The disposal of hazardous and radioactive waste materials is of extreme importance. Federal and state laws and requirements covering such disposals are particularly severe and stringent due to the dangers to plant and animal life if the desired standards are not met and the hazardous or radioactive materials become exposed to the environment. Because of the potential dangers, the United States Nuclear Regulatory Commission has not only identified the hazardous and radioactive materials to date, which list is continually being amended and updated, but has set forth specific standards and requirements for protecting the environment against such waste materials. The resulting laws and regulations are set forth in 10 CFR, particularly sections 1-199. Other regulations relating to transportation, packaging, labeling and identifying hazardous and radioactive materials are also found in 40 CFR, 1-799 and 49 CFR. 100-177. Other publications which relate to classifying, indexing and discussing radioactive and hazardous waste materials include DOE/LLW-14T publication "Waste Classification, A Proposed Methodology For Classifying Low-Level Radioactive Waste", Dec. 1982, DOE/LLW-17T, "Survey of Chemical And Radiological Indexes Evaluating Toxicity", March 1983, FW-874, "Hazardous Waste Land Treatment", April 1983 FW-872 "Guide To The Disposal Of Chemically Stabilized and Solidified Waste", Sept. 1982.

It is the common practice to process the liquid hazardous or radioactive materials by adding absorbents in an attempt to enhance handling and transportation, as well as eventual storage thereof. The materials that have been used heretofore include diatomaceous earth, vermiculite or expanded mica such as zonolite and krolite, portland and gypsum cements, as well as clay materials such as calcium bentonites. A problem with such materials is that only a relatively small amount of liquid can be absorbed or otherwise treated with less than satisfactory results. For example, liquid materials are desirably transported and disposed of in 55 gallon drums. However, it has been found with the use of these absorbents, solid compositions cannot be achieved or if temporarily achieved, liquid separation occurs during transportation or storage. Any separated or free-standing liquids are especially undesirable because of the potential danger of leakage from a ruptured or opened container. It is to the substantial elimination of such problems that the present invention is directed.

In prior co-pendin application Ser. No. 743,057, filed July 10, 1985, (abandoned) is disclosed an improved method of substantially solidifying hazardous or radioactive aqueous liquid compositions using a special sodium montmorillonite high in sodium content. As effective as that material is in achieving desired solidification of aqueous radioactive or hazardous compositions, its suitability for use with water-based or aqueous compositions containing large amounts of dissolved solids, especially those exceeding about 20,000 parts per million is substantially diminished. Moreover, the sodium montmorillonite is not as effective in solidifying the hazardous or radioactive organic liquids such as polyols or polyglycols, or other similar water soluble or miscible organic liquids and aqueous or hydrocarbon mixtures thereof. It is to the substantial solidification of such liquid materials that the present invention is directed.

SUMMARY OF THE INVENTION

An improved method of treating hazardous and radioactive liquid wastes comprises mixing the waste materials with a clay selected from the group consisting of attapulgite, sepiolite, and mixtures thereof in suitable proportions and stirring the mixture under high mechanical shear to produce a substantially solidified composition. The clay material may also be used with an organic ammonium montmorillonite, especially useful where the waste liquid includes liquid hydrocarbons. In addition, where moderate amounts of dissolved solids are present in aqueous waste materials, the clay may also be mixed with sodium montmorillonite. The resulting substantially solidified waste material may be handled, transported and stored under a variety of conditions for extended periods of time without evidence of liquid separation or deterioration. These and other advantages as well as the specific materials used in the invention will be more particularly described in the following detailed description.

DETAILED DESCRIPTION OF THE INVENTION

The method of solidfying the hazardous and radioactive liquid waste compositions according to the invention applies to a great variety of such materials, especially aqueous solutions and mixtures containing substantial amounts of dissolved solids, water soluble or miscible liquids, and aqueous or hydrocarbon mixtures thereof. Many radioactive or hazardous waste liquids contain at least 20,000 parts per million of dissolved solids. Such liquids are difficult to effectively treat for solidification for storage by using sodium montmorillonite as disclosed in the aforesaid co-pending application Ser. No. 743,057 (now abandoned). Especially problematic are dissolved calcium, magnesium, iron and aluminum salts. Large amounts of dissolved chloride and sulfate salts also substantially reduce the solidifying efficiency of the sodium montmorillonite.

Another group of liquid materials to which the invention is particularly effective are water soluble or miscible organic liquids commonly used in pharmaceuticals, detergents and as non-petroleum lubricants. Examples of such materials include polyols such as polyhydric alcohols, alkylene glycols, especially ethylene glycol, glycerol, polyglycerols and polyglycerol esters, and polyglycols such as polyalkylene glycols, particularly polyethylene glycol. These liquids may be found in hazardous or radioactive wastes combined with aqueous or hydrocarbon compositions including reactor plant organic liquids such as turbine, cutting and lubricating oils, solvent sludges which are used to degrease reactor components such as Freon TF, cleaning solvents such as Stoddard solvents, and decontamination solvents. In addition, a great quantity of such wastes are aqueous liquids, containing over about 95% water contaminated with radioactive materials such as greases from reactor plant turbines. Hospital-sourced contaminated liquids contain radioactive materials used in cancer treatments. From such sources, particularly common radioactive materials include radioactive cobalts such as cobalt 57, cobalt 58 and cobalt 60, cesium, plutonium and uranium isotopes, and the like. However, it is to be understood, according to the invention, that any radioactive materials that are to be disposed of and are defined in the aforesaid laws, regulations, and documents are intended to be included in the compositions treated according to the method of this invention, as well as any later identified and added radioactive materials, regardless of source and regardless of the specific radioactive material or radioisotope.

Common hazardous waste materials include acids, bases, chlorinated hydrocarbons including PCB, dioxins, and the like. Again, these as well as the radioactive materials may be in aqueous liquids, particularly those having 95% or more water, or they may be aqueous mixtures containing up to substantial amounts of hydrocarbons. In addition to the above-described water soluble or water miscible liquids which may be treated according to the invention are aldehydes, ketones, acids, ethers, together with a great number of nitrogen, phosphorous and sulfur containing inorganic and organic compounds. By the term water miscible or water soluble as used herein it is intended to cover any of such materials which are "hazardous" or present in radioactive liquid wastes as previously defined. Moreover, as used herein, "hydrocarbons" is intended to define any such oils, solvents and other hydrocarbons or non-aqueous liquids as generally described above which have been contaminated with radioactive materials or which themselves are considered hazardous chemicals according to governmental regulations.

The material used in the method of the present invention for treating the above-described hazardous and radioactive liquid waste materials is a clay selected from the group consisting of attapulgite, sepiolite, and mixtures thereof. Attapulgite is a hydrated magnesium aluminum silicate, a clay material. Sepiolite, sometimes referred to as meerschaum, is a natural hydrous magnesium silicate. The preferred materials are those which meet the American Petroleum Institute specification for oil-well drilling-fluid materials, such as set forth in API Spec 13A, 11th Edition July 1, 1985, Sections 5 and 6. The amount of clay used, which may be either one or a mixture of the aforesaid clays is between about 2.2 and about 5.0 pounds per gallon of aqueous solution or water soluble or miscible organic liquid or mixtures thereof. Again, the use of these clays is particularly desirable and useful in solidifying aqueous solutions having substantial amounts of dissolved solids content, above about 20,000 to 50,000 parts per million or higher. Water soluble or miscible organic liquids which may be solidified by the clays of the invention are as previously described. Of special importance in the aforesaid group of organic liquids is ethylene glycol, used extensively as a coolant and antifreeze material, and glycerol.

In using the aforesaid clays to substantially solidify the liquid wastes, be they aqueous, water soluble or miscible organic liquids, or mixtures thereof, it is necessary to subject the composition to substantial mechanical shear forces to produce the required solidification. This may be carried out by subjecting the liquid composition with the clay added thereto in the aforesaid proportions to stirring of at least about 500 rpm, and more preferably at about 1,000 rpm or greater. Such shearing forces are necessary to dissociate the mineral aggregates and impart the desired characteristics to achieve the desired solidification. At the shearing forces realized by stirring at 1,000 rpm or more, it is usually only necessary to subject the mixtures to the shear forces for a few minutes, up to about 5 to 10 minutes in order to effect solidfication. By the term "solidified" or "substantially solidified" herein it is intended to define a material which is not pourable.

When solidifying an aqueous liquid waste having a more moderate amount of dissolved solids, such as between about 5,000 and about 30,000 parts per million, it has been found that by using a sodium montmorillonite in combination with either or both of the aforesaid clays, substantial solidification or stiffness may be obtained using a smaller amount of total solidification agent mixture than if the attapulgite or sepiolite clays are used alone. For example, it has been found that by substituting between about 5 and about 45% of the attapulgite or sepiolite with sodium montmorillonite, the total amount of solidifying agent required to achieve solidification may be reduced by up to 25% or so. Preferred amounts of sodium montmorillonite used in this embodiment will be between about 20 and 33% of the total solidifying composition mixture. In this embodiment, the total amount of sepiolite or attapulgite combined with sodium montmorillonite, added is conveniently between about 1.5 and about 4.0 pounds per gallon of the liquid.

The sodium montmorillonite to be used contains a major portion of sodium as the exchangeable cation. Such a preferred sodium montmorillonite is described in copending U.S. application Ser. No. 743,057, filed June 10, 1985, (abandoned), the description thereof incorporated herein by reference Accordingly, the preferred sodium montmorillonite used has over about 50% and more preferably above about 60 meq %.

In another embodiment of the invention the aforesaid water soluble or miscible organic liquids mixed with liquid hydrocarbon wastes are solidified by combining either the attapulgite or sepiolite clays or mixtures thereof with an organic ammonium montmorillonite disclosed in my co-pending application Ser. No. 818,323 filed Jan. 13, 1986, the description thereof incorporated herein by reference. The organic ammonium montmorillonites are reaction products of sodium montmorillonite with an amine, amine salt or quaternary ammonium salt and are prepared by methods described in U.S. Pat. Nos. 2,531,427 and 2,966,506, also incorporated herein by reference. Preferred organic ammonium montmorillonites contain at least 10 carbon atoms in the organic portion of the montmorillonite with a readily available and useful material being dimethyl dihydrogenated tallow ammonium montmorillonite The mixtures of hydrocarbon and the water miscible or soluble organic liquids in which this combination of soildifying materials is useful contains between about 5 and 95% of hydrocarbon based on the liquid mixture, by volume. In solidifying such a liquid, the ratio of clay:organic ammonium montmorillonite is about directly proportional to the ratio of the organic liquid:liquid hydrocarbon present by volume, respectively. Moreover, the amount of clay and organic ammonium montmorillonite mixture is preferably between about 2.5 and about 5.5 pounds per gallon of the bulk liquid being solidified. Again, as previously described, the liquid mixture will be subjected to the high shear stirring in order to achieve the desired solidification.

In solidifying the aforesaid hydrocarbon containing liquids, solidification may also be enhanced by utilizing a small amount of polar organic compound. The suitable polar organic compounds are those described in my aforesaid co-pending application and are incorporated herein by reference. Most preferred materials are the lower molecular weight alcohols having between one and about 8 carbon atoms, particularly methyl alcohol, ethyl alcohol, n-propyl alcohol and isopropyl alcohol. The amount of polar organic compound used will be between about 1 and about 10% based on the volume of liquid hydrocarbon. Of course, where the waste liquid already includes a polar organic compound, which list includes the alcohols, carbonates, acetates, ethers, ketones, benzoates and halegenated carbons having between about 1 and about 10 carbon atoms, it will not be necessary to add additional polar material. However, when it is desirable to add the polar organic compound, amounts of between 1 and about 10%, by volume, based on the hydrocarbon present in the waste mixture will be suitable.

In treating the waste liquid composition to obtain solidification, as previously noted, it is convenient to place about 45 gallons of the waste liquid into a 55 gallon drum. The clay material, whether it be sepiolite, attapulgite, mixtures thereof, or mixtures of those clays with sodium montmorillonite or organic ammonium montmorillonite as previously described, is added with stirring of the aforesaid mechanical shear forces until substantial solidification is achieved. The solidification material is preferably added together although it may be added separately. After the composition has been stirred for the desired amount of time, usually a few minutes will be sufficient, it may be allowed to stand for a period of time after it has been "set up", normally about 24 hours, and then inspected to see if any liquid has separated. If additional solidification is needed, more of the solidification materials may be added with additional stirring to complete the solidification process.

By way of example, different liquid hazardous waste materials were treated in laboratory equivalents of the following:

EXAMPLE I

To 45 gallons of pure ethylene glycol was added pounds of attapulgite. The mixture was stirred at about 1000 rpm for about 5 minutes resulting in a thick, stiff, unpourable composition. The same result was achieved substituting sepiolite as the solidfying agent.

By way of comparison, 350 pounds of sodium montmorillonite was required to solidify 25 gallons of the ethylene glycol to substantially the same solid consistency.

EXAMPLE II

A 40 gallon sample of a 20% aqueous sodium chloride and stirred at 1000 rpm for 5 minutes to achieve a thick, solution was mixed with 190 pounds of sepiolite stiff, unpourable composition. The same result was achieved substituting attapulgite for the sepiolite.

By comparison, 300 pounds of sodium montmorillonite was required to solidify 30 gallons of the 20% sodium chloride solution.

EXAMPLE III

Forty-five gallons of an 8% aqueous sodium chloride solution was mixed with 225 pounds attapulgite and stirred at 1000 rpm for 5 minutes to achieve a stiff, substantially solidified material.

To another 45 gallon sample of the aqueous 8% sodium chloride solution was added a mixture of 120 pounds attapulgite and 60 pounds sodium montmorillonite with stirring at 1000 rpm to obtain a substantially solid composition of the same consistency.

The tests were repeated substituting sepiolite for attapulgite with substantially the same results.

I claim:

1. A method of disposing of radioactive or hazardous liquid wastes comprising a water soluble or miscible organic liquid, an aqueous solution having a dissolved solids content of about 5,000 parts per million or more, and mixtures thereof comprising adding thereto between about 2.2 and about 5.0 pounds of a clay selected from the group consisting of attapulgite, sepiolite, and mixtures thereof per gallon of said liquid and stirring the mixture under high mechanical shear until it is substantially solidified.

2. The method of claim 1 wherein said composition is subjected to high shear stirring of at [lease] *least* about 500 rpm.

3. The method of claim 1 wherein said composition is subjected to high shear stirring of at least about 1,000 rpm.

[4. A method of disposing of radioactive or hazardous water soluble or miscible organic liquids and having between about 5% and about 95% liquid hydrocarbon by volume, comprising mixing said liquid with a mixture of clay selected from the group attapulgite, sepiolite, and mixtures thereof and an organic ammonium montmorillonite having at least 10 carbon atoms at a ratio of clay:organic ammonium montmorillonite about directly proportional to the ratio of said organic liquid:-liquid hydrocarbon, by volume, respectively, and wherein the amount of said clay and organic ammonium montmorillonite mixture is between about 2.5 and about 5.5 pounds per gallon of total bulk liquid, and stirring the mixture under high mechanical shear until it is substantially solidified.]

5. [The method of claim 4 including adding] *A method of disposing of radioactive or hazardous water soluble or miscible organic liquids and having between about 5% and about 95% liquid hydrocarbon by volume, comprising mixing said liquid with a mixture of clay selected from the group consisting of attapulgite, sepiolite, and mixtures thereof and an organic ammonium montmorillonite having at least 10 carbon atoms, at a ratio of clay:organic ammonium montmorillonite about directly proportional to the ratio of said organic liquid:liquid hydrocarbon, by volume, respectively, and wherein the amount of said clay and organic ammonium montmorillonite mixture is between about 2.5 and about 5.5 pounds per gallon of total bulk liquid, and* between about 1 and about 10% by volume of a polar organic compound based on the hydrocarbon [.], *and stirring the mixture under high mechanical shear until it is substantially solidified.*

[6. The method of claim 4 including adding] *A method of disposing of radioactive or hazardous water soluble or miscible organic liquids and having between*

*about 5% and about 95% liquid hydrocarbon by volume, comprising mixing said liquid with a mixture of clay selected from the group consisting of attapulgite, sepiolite, and mixtures thereof and an organic ammonium montmorillonite having at least 10 carbon atoms, at a ratio of clay:organic ammonium montmorillonite about directly proportional to the ratio of said organic liquid:liquid hydrocarbon, by volume, respectively, and wherein the amount of said clay and organic ammonium montmorillonite mixture is between about 2.5 and about 5.5 pounds per gallon of total bulk liquid, and* between about 1 and about 10% of an alcohol having between 1 and 3 carbon atoms based on the hydrocarbon [.]. *and stirring the mixture under high mechanical shear until it is substantially solidified.*

7. A method of disposing of an aqueous radioactive or hazardous liquid having a dissolved solids content of between about 5,000 and about 30,000 parts per million comprising adding thereto a mixture of between about 55% and about 95% of a clay selected from the group consisting of attapulgite, sepiolite, and mixtures thereof and between about 5% and about 45%, by weight, sodium montmorillonite having sodium as the major exchangeable cation, said mixture added in an amount of between about 1.5 and about 4.0 pounds per gallon of said liquid, and stirring the mixture under high mechanical shear until it is substantially solidified.

8. A substantially solidified hazardous or radioactive composition consisting essentially of water soluble or miscible organic liquid, an aqueous solution having a dissolved solids content of at least about 20,000 parts per million, and mixtures thereof, and between about 2.2 and about 5.0 pounds of a clay selected from the group consisting of attapulgite, sepiolite, and mixtures thereof per gallon of liquid.

9. The composition of claim 8 wherein said water soluble or miscible organic liquid is selected from the group consisting of polyhydric alcohols, glycyerols, and plyalkylene glycols.

10. A substantially solidified hazardous or radioactive composition consisting essentially of an aqueous solution having between about 5,000 and about 30,000 parts per million dissolved solids and a mixture of between about 55% and about 95% by weight of a clay selected from the group consisting of attapulgite, sepiolite, and mixtures thereof, and between about 5% and about 45%, by weight sodium montmorillonite having sodium as the major cation said mixture of said clay and sodium montmorillonite being present in an amount of between about 1.5 and about 4.0 pounds per gallon of said liquid.

11. The composition of claim 10 including between about 5 and about 95% by volume based on said aqueous solution of a water soluble or miscible organic waste liquid selected from the group consisting of aldehydes, ketones, acids, ethers, esters, alcohols, polyols and polyglycols.

[12. A substantially solidified hazardous or radioactive composition consisting essentially of a water soluble or miscibel organic liquid and a liquid hydrocarbon and a mixture of a clay selected from the group consisting of attapulgite, sepiolite, and mixtres thereof and an organic ammonium montmorillonite having at least 10 carbon atoms wherein said amount of said clay and said organic ammonium montmorillonite is between about 2.5 and about 5.5 pounds per gallon of said liquid.]

[13. The composition of claim 12 wherein the liquids comprise between about 5% and about 95% organic liquid and between about 5% and about 95% liquid hydrocarbon, by volume, and wherein the ratio of said clay:organic ammonium montrmorillonite is about directly proportional to the ratio of said organic liquid:-liquid hydrocarbon, respectively.]

14. The method of claim 1 including substituting between about 5 and about 45% of said clay with sodium montmorillonite.

*15. A method of disposing of radioactive or hazardous liquid wastes comprising a water soluble or miscible organic liquid, an aqueous solution and mixtures thereof comprising adding thereto between about 2.2 and about 5.0 pounds of a clay selected from the group consisting of attapulgite, sepiolite, and mixtures thereof per gallon of said liquid and stirring the mixture under high mechanical shear until it is substantially solidified.*

*16. A method of disposing of an aqueous radioactive or hazardous liquid comprising adding thereto a mixture of between about 55% and about 95% of a clay selected from the group consisting of attapulgite, sepiolite, and mixtures thereof and between about 5% and about 45%, by weight, sodium montmorillonite having sodium as the major exchangeable cation, said mixture added in an amount of between about 1.5 and about 4.0 pounds per gallon of said liquid, and stirring the mixture under high mechanical shear until it is substantially solidified.*

*17. A substantially solidified hazardous or radioactive composition consisting essentially of water soluble or miscible organic liquid, an aqueous solution, and mixtures thereof, and between about 2.2 and about 5.0 pounds of a clay selected from the group consisting of attapulgite, sepiolite, and mixtures thereof per gallon of liquid.*

*18. A substantially solidified hazardous or radioactive composition consisting essentially of an aqueous solution and a mixture of between about 55% and about 95% by weight of a clay selected from the group consisting of attapulgite, sepiolite, and mixtures thereof, and between about 5% and about 45%, by weight sodium montmorillonite having sodium as the major cation said mixture of said clay and sodium montmorillonite being present in an amount of between about 1.5 and 4.0 pounds per gallon of said liquid.*

* * * * *